(12) United States Patent
Mizoguchi et al.

(10) Patent No.: US 9,664,980 B2
(45) Date of Patent: May 30, 2017

(54) OPTICAL DEVICE AND IMAGE DISPLAY DEVICE

(71) Applicant: Seiko Epson Corporation, Tokyo (JP)

(72) Inventors: Yasushi Mizoguchi, Suwa (JP); Takao Hirakura, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/868,793

(22) Filed: Sep. 29, 2015

(65) Prior Publication Data

US 2016/0091773 A1 Mar. 31, 2016

(30) Foreign Application Priority Data

Sep. 30, 2014 (JP) .................................. 2014-202061

(51) Int. Cl.
*G02B 26/08* (2006.01)
*G02F 1/29* (2006.01)
*G02B 26/10* (2006.01)
*G03B 21/14* (2006.01)

(52) U.S. Cl.
CPC ............. *G02F 1/29* (2013.01); *G02B 26/085* (2013.01); *G02B 26/10* (2013.01); *G03B 21/14* (2013.01)

(58) Field of Classification Search
CPC ........... G02F 1/29; G03B 21/14; G02B 26/10; G02B 26/101; G02B 26/105; G02B 26/0833; G02B 26/0841; G02B 26/085; G02B 26/0858
USPC ..................... 359/197.1–199.4, 200.6–200.8, 359/212.1–214.1, 221.1–221.2, 359/223.1–225.1, 226.2; 310/36, 40 R, 310/48, 66
See application file for complete search history.

(56) References Cited

U.S. PATENT DOCUMENTS

| 7,477,035 B2 * | 1/2009 | Lee ........................ G03B 21/14 |
| | | 318/480 |
| 2005/0219677 A1 | 10/2005 | Krylov et al. |
| 2005/0225833 A1 | 10/2005 | Marshall |

FOREIGN PATENT DOCUMENTS

| EP | 1986411 A2 | 10/2008 |
| JP | 2011-158589 A | 8/2011 |
| WO | WO-2006-022820 A2 | 3/2006 |

OTHER PUBLICATIONS

Extended European Search Report for Application No. EP 15187080.5 dated Feb. 4, 2016 (9 pages).

* cited by examiner

*Primary Examiner* — James Phan
(74) *Attorney, Agent, or Firm* — Harness, Dickey & Pierce, P.L.C.

(57) ABSTRACT

An optical device includes an optical section, a moving section, a shaft section, and an actuator. The optical section includes a light-incident surface on which light is incident. The moving section supports the optical section and the shaft section swingably supports the moving section. The actuator swings the moving section based on a drive signal having a trapezoidal waveform. A swing waveform representative of a trajectory of the moving section as the moving section is swung has a trapezoidal waveform. A maintenance time of a flat portion of the trapezoidal waveform of the drive signal is shorter than a maintenance time of a flat portion of the trapezoidal waveform of the swing waveform of the moving section.

20 Claims, 8 Drawing Sheets

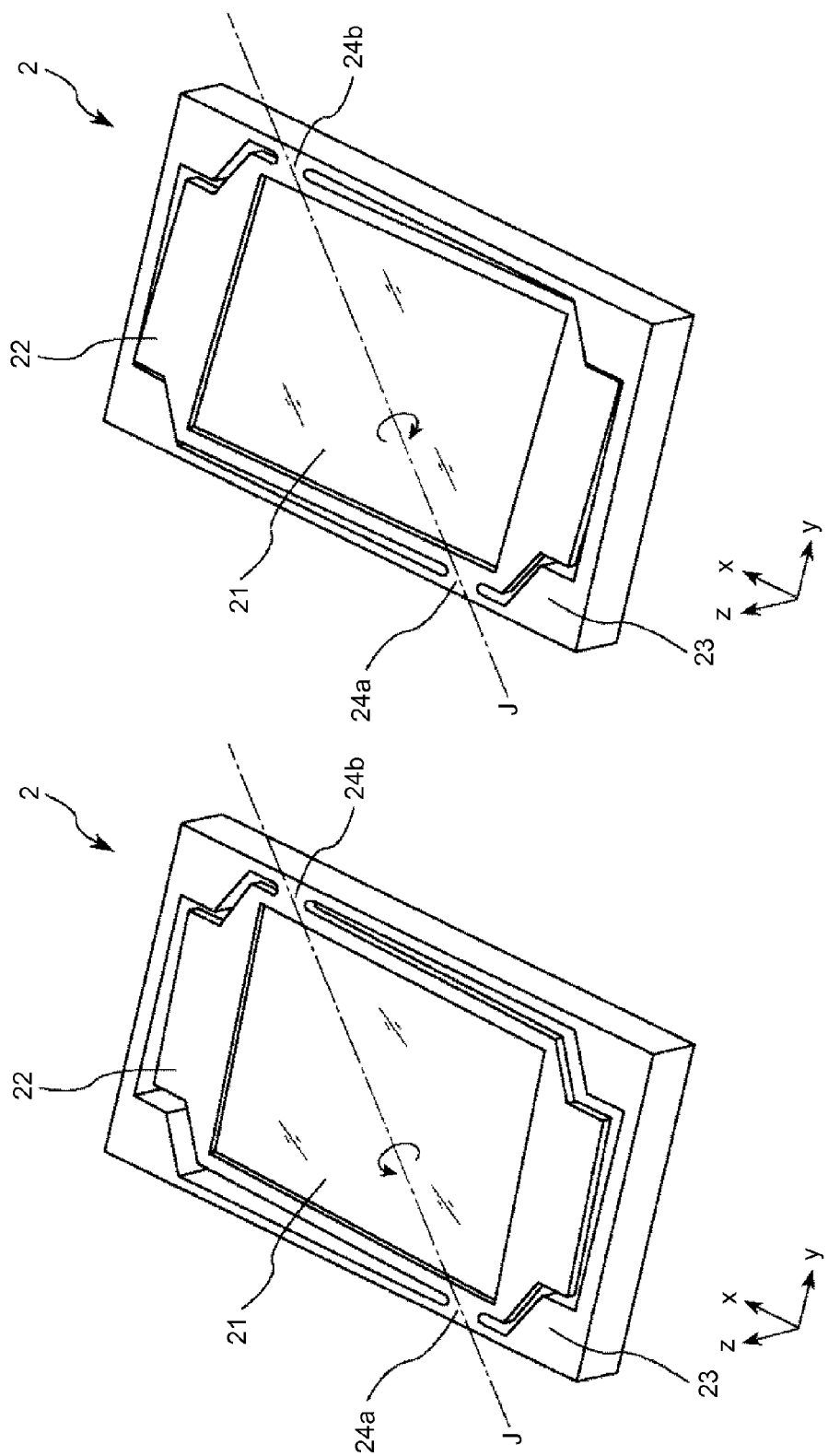

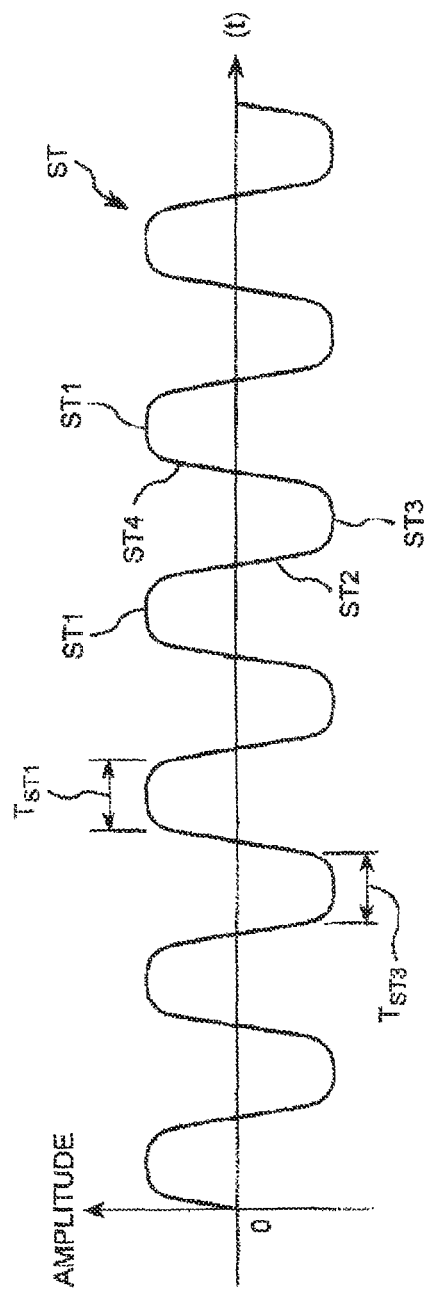
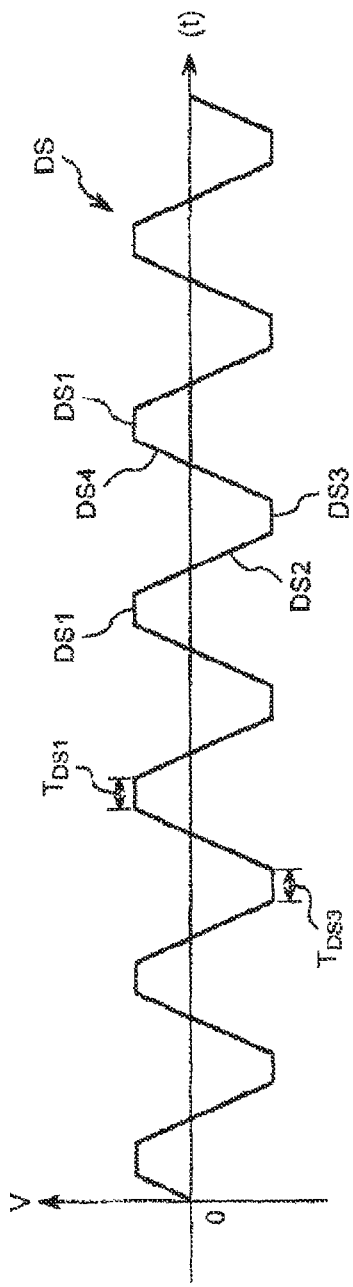
FIG. 7B
FIG. 7A

OPTICAL DEVICE AND IMAGE DISPLAY DEVICE

BACKGROUND

1. Technical Field

The present disclosure relates to an optical device and an image display device.

2. Related Art

To increase the resolution of an image to be projected to a value more than the resolution of an optical modulation device of a liquid crystal panel, an axis of an image light emitted from the optical modulation device can be shifted. As an example, JP-A-2011-158589 describes an optical path control device that shifts an axis of an image light. The optical path control device described in JP-A-2011-158589 includes a glass plate, a moving section that holds the glass plate, a support section that supports the moving section, and a pair of plate springs that couples the moving section to the support section. A posture of the glass plate is changed by swinging a retention member by using the plate spring as a rotation axis. Accordingly, the light (image light) which is incident on the glass plate is deflected, and the axis is shifted. To reduce unwanted vibration of a holding member, the optical path control device of JP-A-2011-158589 configures a drive signal as a wave in which a sine wave is connected between a maximum value maintained for a predetermined time and a minimum value maintained for a predetermined time.

However, if the drive signal is used, an image, which is displayed, is degraded due to factors different from unwanted vibration. For example, to display a sharper image, a maintenance time of the maximum value and a maintenance time of the minimum value is increased during a unit period. However, in the drive signal of JP-A-2011-158589, the maximum value and the minimum value are connected by a sine wave and, thus, the maintenance times of the maximum value and the minimum value during a unit period are short thereby affecting the displayed image. In addition, the moving section vibrates on the opposite side once (at a moment) by the sine wave that connects the maximum value to the minimum value and, thus, the image light is blurred.

SUMMARY

An advantage of some aspects of the present disclosure is to provide an optical device which can reduce degradation of an image, and an image display device including the optical device.

The object is achieved by the following aspects of the present disclosure.

An optical device according to an aspect of the present disclosure includes: an optical section that includes a light-incident surface on which light is incident; a moving section that supports the optical section; a shaft section that swingably supports the moving section; and an actuator that swings the moving section, in which a waveform of trajectory (i.e., a swing waveform) at the time of swinging of a predetermined portion of the moving section, and a waveform of a drive signal that is applied to the actuator for swinging the moving section are a trapezoidal wave, and in which a maintenance time of a flat portion of the trapezoidal wave that is the drive signal is shorter than a maintenance time of a flat portion of the trapezoidal wave that is a swing trajectory of the moving section.

With this configuration, it is possible to provide an optical device that may reduce degradation of an image.

In the optical device, it is preferable that frequency components of the drive signal are configured by a fundamental frequency and odd order harmonics of a sine wave.

With this configuration, the drive signal is easily generated.

In the optical device, it is preferable that the maintenance time of the flat portion of the drive signal is changed by changing a ratio between the fundamental frequency and the odd order harmonics.

With this configuration, it is possible to simply adjust the maintenance time of the flat portion.

In the optical device, it is preferable that the frequency components contained in the drive signal differs from resonance frequencies of a vibration system that swings the moving section.

With this configuration, it is possible to swing the moving section during non-resonance drive.

In the optical device, it is preferable that a torsional resonance frequency that swings the moving section, among the resonance frequencies of the vibration system, is positioned between the fundamental frequency of frequency components of the drive signal and a fifth harmonic of the odd order harmonics.

With this configuration, it is possible to reduce an unwanted vibration, and to efficiently swing the moving section.

In the optical device, it is preferable that the actuator is an electromagnetic drive actuator.

With this configuration, it is possible to swing the moving section using a sufficient force.

In the optical device, it is preferable that the actuator includes a permanent magnet and a coil that generates an electric field which acts on the permanent magnet, and one of the permanent magnet and the coil is provided in the moving section, and the other is provided so as to face the other one.

With this configuration, the configuration of the actuator becomes simple.

In the optical device, it is preferable that the optical section has light-transmitting property.

With this configuration, an axis of light which passes through the optical section may be changed by changing the posture of the optical section.

In the optical device, it is preferable that the optical section and the shaft section include resin materials.

With this configuration, it is possible to reduce a change of the swing trajectory of the moving section with respect to the environmental temperature.

An image display device according to another aspect of the present disclosure includes: the optical device according to the aspect.

With this configuration, it is possible to provide an image display device which can reduce degradation of an image.

In the image display device, it is preferable that a position of a pixel that is displayed by application of light is shifted by spatially modulating the light using the optical device.

With this configuration, appearance of the pixels may increase, and resolution of an image increases.

BRIEF DESCRIPTION OF THE DRAWINGS

The present disclosure will be described with reference to the accompanying drawings, wherein like numbers reference like elements.

FIGS. 6A and 6B are perspective views illustrating an operation of the optical path deflecting element illustrated in FIGS. 4A and 4B.

FIGS. 7A and 7B are diagrams illustrating a swing trajectory and a drive signal of a moving section, respectively.

DESCRIPTION OF EXEMPLARY EMBODIMENTS

Hereinafter, an optical device and an image display device according to the present disclosure will be described in detail based on each embodiment illustrated in the accompanying drawings.

First Embodiment

Figure 1:
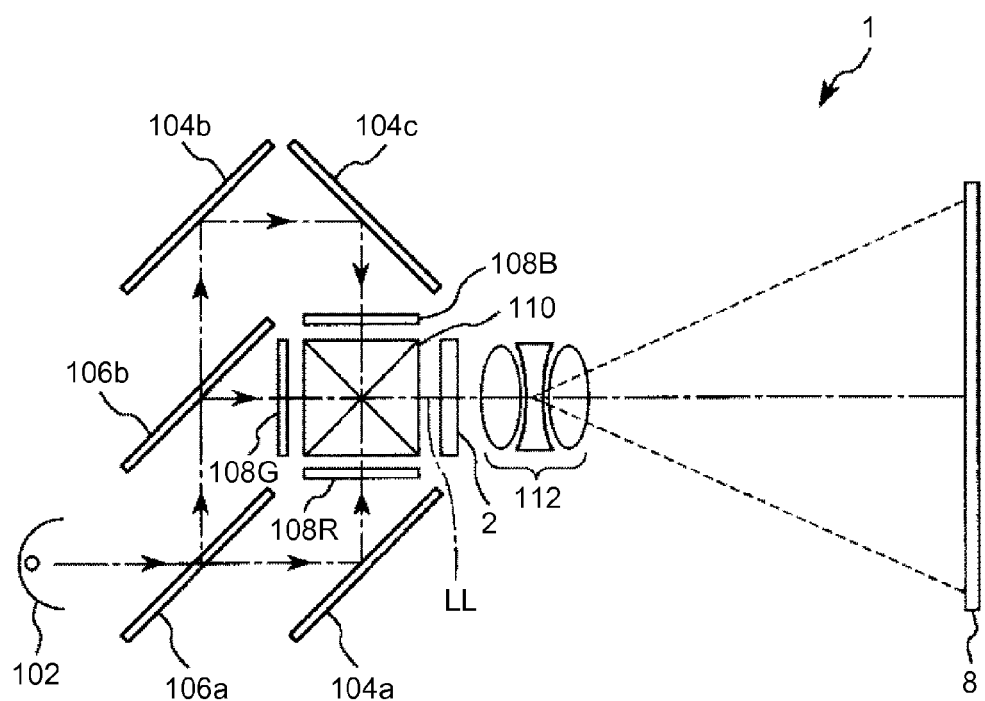
FIG. 1 is a view illustrating an optical configuration of an image display device according to a preferred embodiment of the present disclosure.
Figure 2:
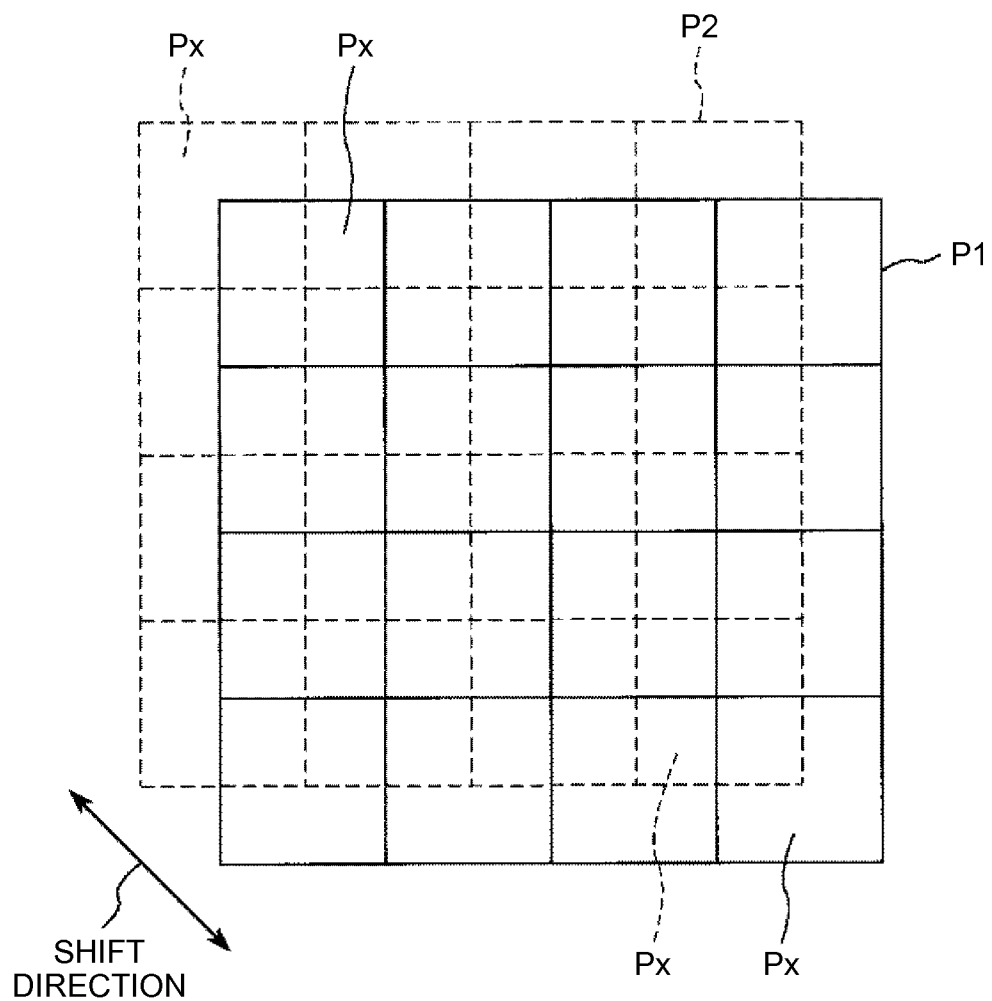
FIG. 2 is a diagram illustrating a state in which image light is shifted.
Figure 3:
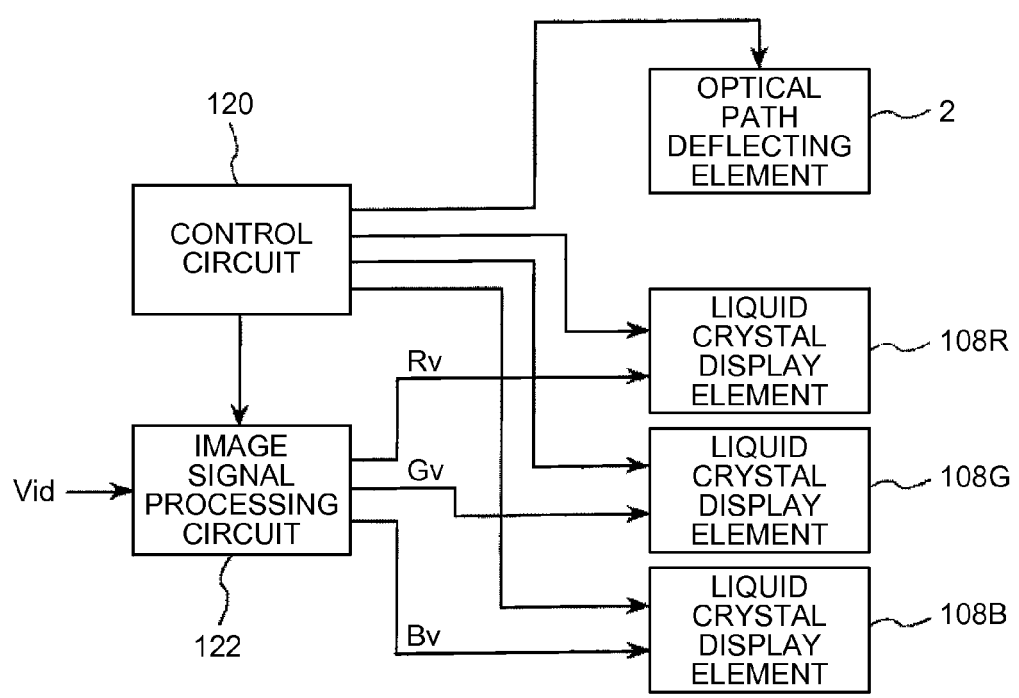
FIG. 3 is a block diagram illustrating an electrical configuration of the image display device illustrated in FIG. 1.
Figure 4B:
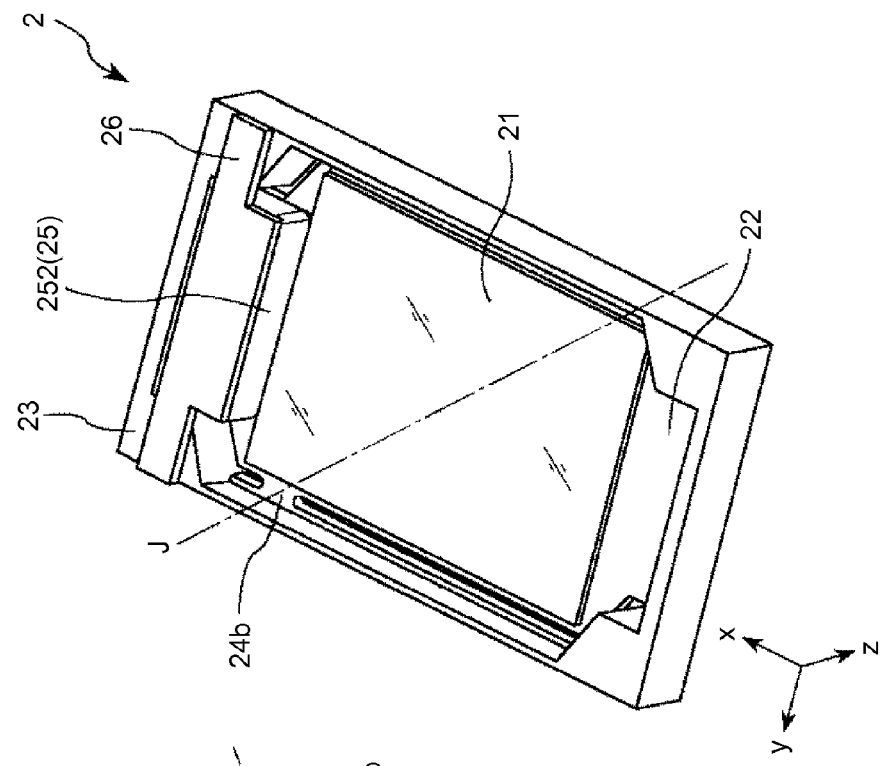
FIGS. 4A and 4B are perspective views of an optical path deflecting element having the image display device illustrated in FIG. 1.
Figure 4A:
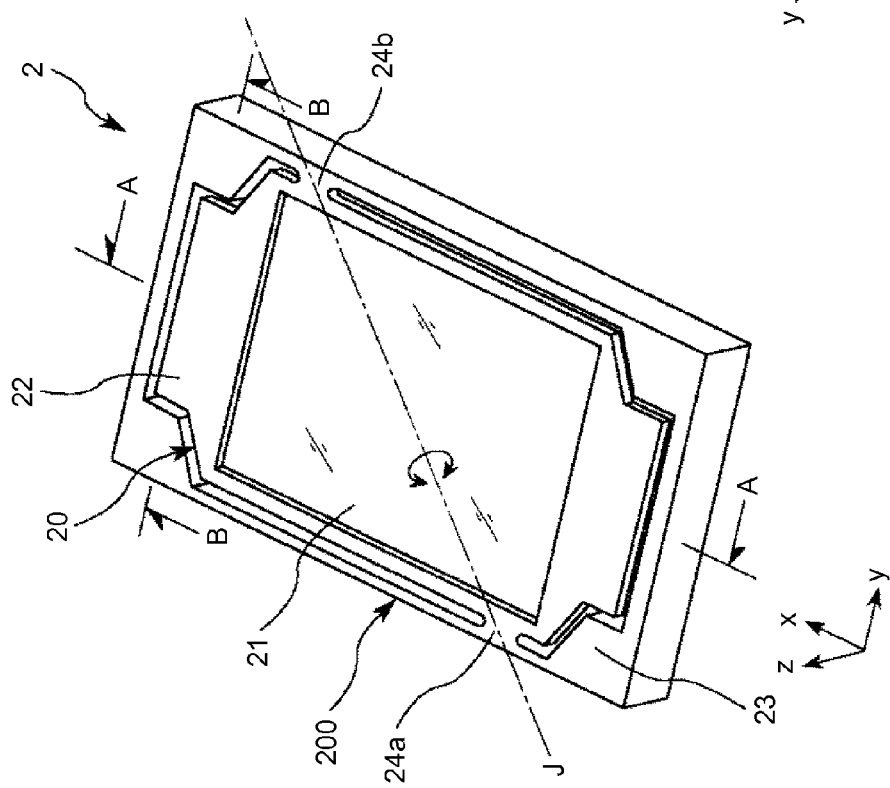
Figure 5A:
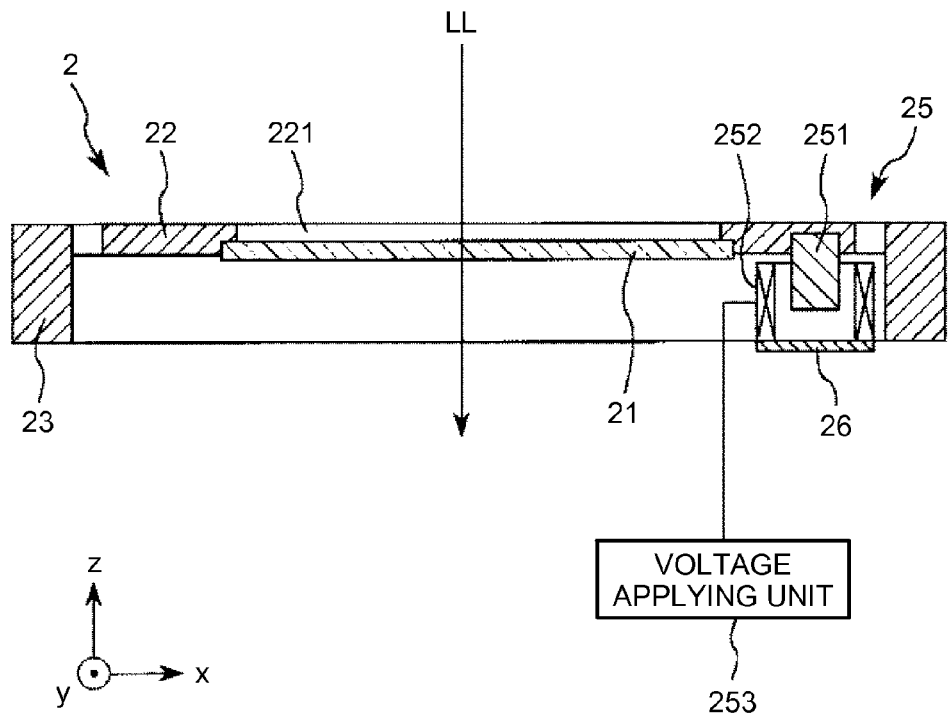
FIGS. 5A and 5B are respectively a cross-sectional view taken along line A-A illustrated in FIG. 4A and a cross-sectional view taken along line B-B illustrated in FIG. 4A.
Figure 5B:
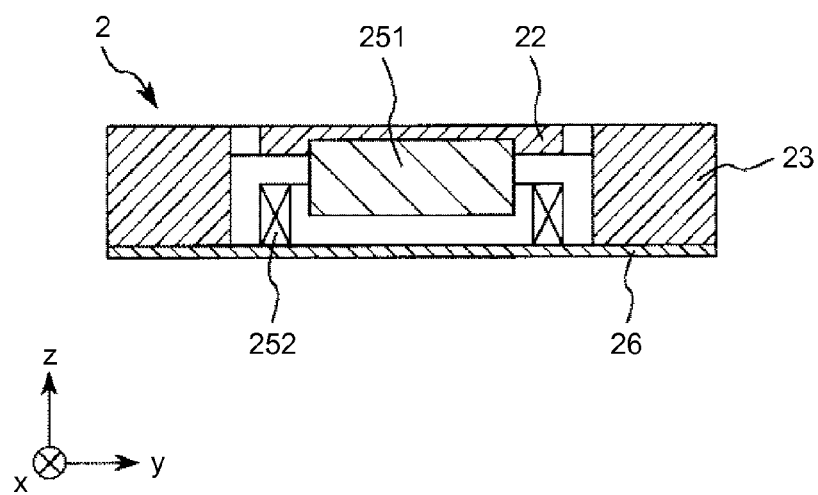
Figure 8:
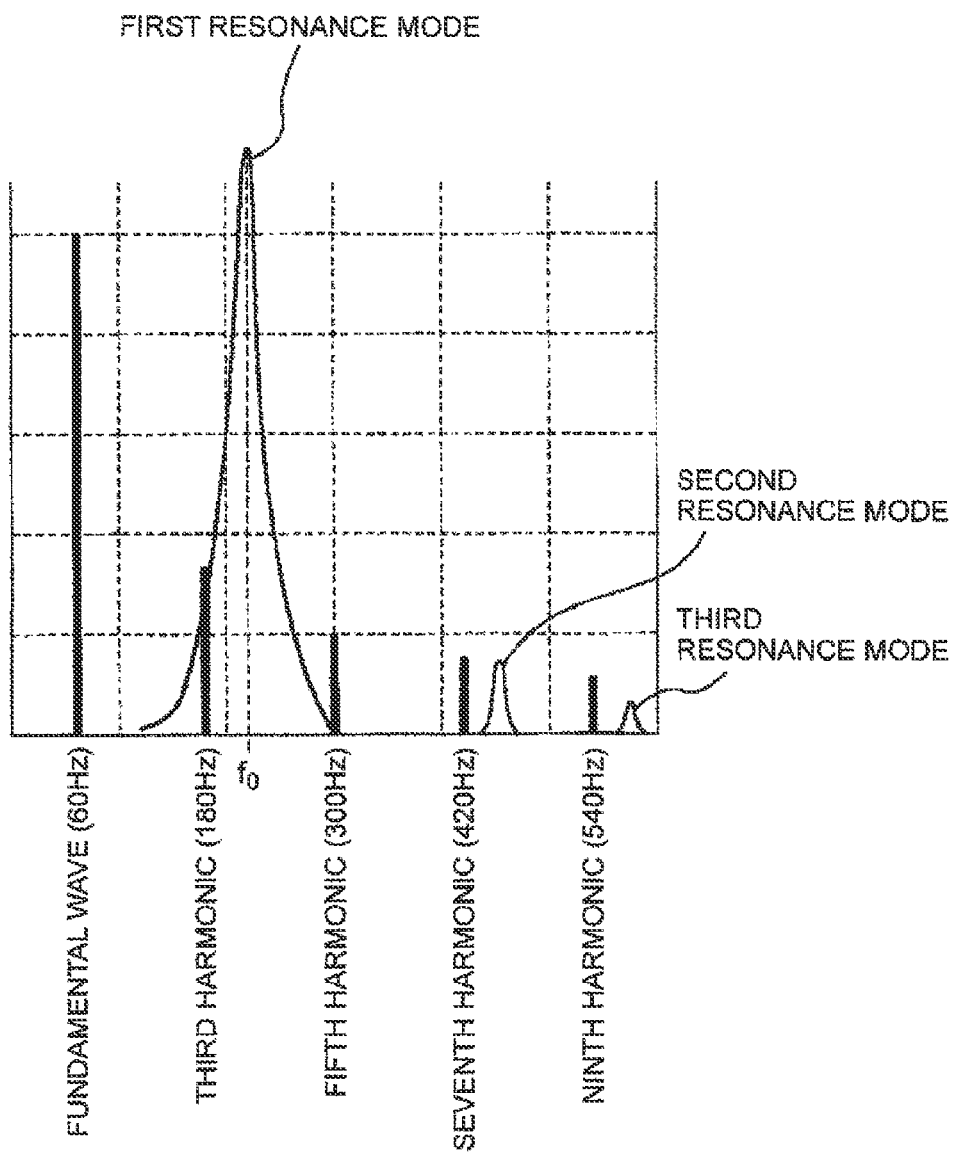
FIG. 8 is a graph illustrating a relationship between a resonance frequency of the optical path deflecting element and the drive signal.

FIG. 1 is a view illustrating an optical configuration of an image display device according to a preferred embodiment of the present disclosure. FIG. 2 is a diagram illustrating a state in which image light is shifted. FIG. 3 is a block diagram illustrating an electrical configuration of the image display device illustrated in FIG. 1. FIGS. 4A and 4B are perspective views of an optical path deflecting element having the image display device illustrated in FIG. 1. FIGS. 5A and 5B are respectively a cross-sectional view taken along line A-A illustrated in FIG. 4A and a cross-sectional view taken along line B-B illustrated in FIG. 4A. FIGS. 6A and 6B are perspective views illustrating an operation of the optical path deflecting element illustrated in FIGS. 4A and 4B. FIG. 7 is a diagram illustrating a relationship between a drive signal and swing trajectory of a moving section. FIG. 8 is a graph illustrating a relationship between a resonance frequency of the optical path deflecting element and the drive signal.

For convenience of description, FIG. 4A to FIG. 5B illustrate three axes, which are orthogonal to each other, of an x-axis, a y-axis, and a z-axis. Front end sides of arrows illustrated in the figures will be referred to as "+ side", and a base end side will be referred to as "−side". Hereinafter, a direction parallel to the x-axis will also be referred to as "x-axis direction", a direction parallel to the y-axis will also be referred to as "y-axis direction", a direction parallel to the z-axis will also be referred to as "z-axis direction", a +z side will be referred to as "top", and a −z side will be referred to as "bottom".

1. Projector

A projector 1 illustrated in FIG. 1 may also be referred to as "liquid crystal projector." As illustrated in FIG. 1, the projector 1 includes a light source 102, mirrors 104A, 104B, and 104C, dichroic mirrors 106A and 106B, liquid crystal display elements 108R, 108G, and 108B, a dichroic prism 110, an optical path deflecting element (optical device) 2, and a projection lens system 112.

The light source 102 may be, for example, a halogen lamp, a mercury lamp, a light emitting diode (LED), and/or other suitable element that emits white light. Light which is emitted from the light source 102 is first divided by the dichroic mirror 106A into red light (R) and the other light. The red light is reflected by the mirror 104A and is incident on the liquid crystal display element 108R. The other light is further divided into green light (G) and blue light (B) by the dichroic mirror 106B. The green light is incident on the liquid crystal display element 108G. The blue light is reflected by the mirrors 104B and 104C and is incident on the liquid crystal display element 108B.

The liquid crystal display elements 108R, 108G, and 108B are respectively used as spatial light modulators. The liquid crystal display elements 108R, 108G, and 108B are respectively spatial light modulators of a transmission type corresponding to primary colors of R, G, and B. The liquid crystal display elements 108R, 108G, and 108B include pixels arranged in a matrix of, for example, 1080 vertical rows and 1920 horizontal columns (i.e., 1080 by 1920 matrix). In each pixel, an amount of transmitted light with respect to the incident light is adjusted, and the light amount distribution of all pixels in the liquid crystal display elements 108R, 108G, and 108B is cooperatively controlled. Lights which are respectively and spatially modulated by the liquid crystal display elements 108R, 108G, and 108B are synthesized by the dichroic prism 110, and image light LL of a full color is emitted from the dichroic prism 110. The emitted image light LL is expanded by the projection lens system 112 and is projected onto a screen 8.

Here, the projector 1 includes the optical path deflecting element 2 between the dichroic prism 110 and the projection lens system 112. The projector 1 shifts (i.e., a "pixel shift") an optical axis of the image light LL using the optical path deflecting element 2, thereby being able to project an image with a resolution higher than the resolution of the liquid crystal display elements 108R, 108G, and 108B onto the screen 8 (e.g., 4 k if the liquid crystal display elements 108R, 108G, and 108B have full high definition). The optical path deflecting element 2 includes a glass plate 21 through which the image light LL passes through, and by changing the posture of the glass plate 21, an optical axis of the image light LL is shifted. This principle is described with reference to FIG. 2. The projector 1 is configured, in such a manner that the image display position P1 in a case in which the optical axis of the image light LL is shifted on one side, and the image display position P2 in a case in which the optical axis of the image light LL is shifted on the other side, are shifted by half of a pixel (that is, half of the pixel Px) in a diagonal direction (arrow direction in FIG. 2), using the shift of the optical axis. Images are alternately displayed on the image display positions P1 and P2, and thus pixels increase in appearance. The projector 1 achieves a high resolution of the image which is projected onto the screen 8. An amount of shift of the image display positions P1 and P2 is not limited to half of the pixel, and may be a quarter of the pixel Px or one eighth of the pixel Px.

As illustrated in FIG. 3, in addition to the optical path deflecting element 2 or each of liquid crystal display elements 108R, 108G, and 108B, the projector 1 also includes a control circuit 120 and an image signal processing circuit 122. The control circuit 120 controls a write operation of a data signal to the liquid crystal display elements 108R, 108G, and 108B, an optical path deflecting operation of the optical path deflecting element 2, and a data signal generating operation of the image signal processing circuit 122. Meanwhile, the image signal processing circuit 122 divides an image signal Vid which is supplied from an external device, not illustrated, into three primary colors of R, G, and B, and converts the primary colors into data signals Rv, Gv, and Bv suitable for operations of the respective liquid crystal display elements 108R, 108G, and 108B. The converted data signals Rv, Gv, and Bv are supplied to the liquid crystal display elements 108R, 108G, and 108B, to operate the liquid crystal display elements 108R, 108G, and 108B.

2. Optical Path Deflecting Element

Next, the optical path deflecting element 2 included in the above-described projector 1 will be described in detail.

As illustrated in FIGS. 4A, 4B, 5A, and 5B, the optical path deflecting element 2 includes a moving section 22, a frame-shaped support section 23, shaft sections 24a and 24b, and a drive mechanism actuator 25. The moving section 22 has the glass plate (optical section) 21 that has light-transmitting property and deflects the image light LL. The frame-shaped support section 23 is provided around the moving section 22. The shaft sections 24a and 24b couple the moving section 22 to the support section 23 and support the moving section 22 so as to be able to swing (rotate) with respect to the support section 23. The drive mechanism (actuator) 25 swings the moving section 22 with respect to the support section 23. The optical path deflecting element 2 is disposed in the projector 1 in such a manner that the +z side faces the dichroic prism 110 side, and the −z side faces the projection lens system 112 side.

The moving section 22 has a flat plate shape, and includes a hole 221 in a central portion thereof. The glass plate 21 is fitted in the hole 221, and the moving section 22 adheres to the glass plate 21 by an adhesive or the like. The hole 221 has a step on a circumferential surface thereof, and receives the glass plate 21 in the step. By doing so, the glass plate 21 is simply disposed in the moving section 22.

The glass plate 21 has a substantially rectangular plane shape, and is disposed in such a manner that a longitudinal direction thereof is substantially parallel to the x-axis direction. Since the posture of the glass plate 21 is adjustable, that is, an incident angle of the image light LL may be changed, the glass plate 21 may deflect the image light LL that is incident and may make the image light pass therethrough. Thus, the posture of the glass plate 21 is adjustable to form a desired incident angle, and a deflection direction or an amount of deflection of the image light LL may be controlled. The size of the glass plate 21 is suitably set in such a manner that the image light LL, which is emitted from the dichroic prism 110, may pass therethrough. It is preferable that the glass plate 21 is substantially colorless and transparent. An anti-reflection film may be formed on a surface on an incident side and a surface on an emission side of the image light LL.

A configuration material of the glass plate 21 is not particularly limited, but various types of glass materials, such as, a white plate glass, borosilicate glass, or quartz glass can be used as the configuration material. In the present embodiment, the glass plate 21 can be used as an optical section, but the optical section is not particularly limited, if the optical section is configured by a material with light-transmitting property. The optical section may be configured by, for example, various types of crystalline materials such as quartz crystal or sapphire, or various types of resin materials such as polycarbonate resin or acrylic resin. However, it is preferable that the glass plate 21 is used as the optical section in the same manner as in the present embodiment. By doing so, the rigidity of the optical section can particularly increase, and thus it is possible to particularly reduce irregularities of light deflection which is deflected in the optical section.

The frame-shaped support section 23 is provided around the moving section 22 by which the glass plate 21 is supported, and the moving section 22 and the support section 23 are coupled to each other by the shaft sections 24A and 24B. The shaft sections 24A and 24B are shifted in the x-axis direction and the y-axis direction in a planar view, and form a swing axis J of the moving section 22. By doing so, the moving section 22 swings around the swing axis J which is tilted at approximately 45 degrees with respect to both the x-axis and the y-axis, and the posture of the glass plate 21 is changed by the swinging. Particularly, in the optical path deflecting element 2, the shaft sections 24A and 24B are disposed in point symmetry with respect to the center of the glass plate 21, in a planar view and, thus, a swing balance of the moving section 22 and the glass plate 21 is improved.

As described above, the moving section 22, the support section 23, and the shaft sections 24A and 24B are configured as one piece (integrally formed). By doing so, impact resistance and long-term durability of a boundary portion between the support section 23 and the shaft sections 24A and 24B, or a boundary portion between the shaft sections 24A and 24B and the moving section 22, is increased.

The moving section 22, the support section 23, and the shaft sections 24A and 24B are configured by a material with a Young's modulus smaller than that of a configuration material of the glass plate 21. It is preferable that the configuration material contains a resin, and it is more preferable that the configuration material contains a resin as a main component. By doing so, it is possible to effectively prevent stress which is generated according to the swing of the moving section 22 leading to unwanted vibration of the glass plate 21 itself. Side surfaces of the glass plate 21 can be surrounded by the moving section 22 with a relatively small Young's modulus. When the posture of the glass plate 21 is changed, it is possible to reduce the stress generated in the glass plate 21, and to reduce unwanted vibration generated in the glass plate 21 according to a stress distribution. As a result, it is possible to prevent an image which is deflected by the glass plate 21 from being deflected in an unintended direction, and to reduce a change of the swing trajectory of the moving section 22 with respect to the environmental temperature.

The resin is not particularly limited. For example, polyethylene, polypropylene, silicone, polyacetal, polyamide, polycarbonate, polyphenylene ether, polyethylene terephthalate, polybutylene terephthalate, polyarylate, polysulfone, polyether sulfone, polyphenylene sulfide, polyether ether ketone, polyimide, polyether imide, or fluorine resin is used as the resin, and a material containing at least one type of the materials is used as the resin.

The drive mechanism 25 swings the moving section 22 and is an electromagnetic actuator. The drive mechanism 25 includes a permanent magnet 251, a coil 252, and a voltage applying unit 253 that generates an electric field acting on the permanent magnet 251 from the coil 252 by applying a drive signal DS that is an alternating voltage to the coil 252. Since an amount of power strong enough to swing the moving section 22 may be generated by using an electromagnetic actuator as the drive mechanism 25, it is possible to smoothly swing the moving section 22.

The permanent magnet 251 is provided on an edge section of the moving section 22, and forms a longitudinal shape along the y-axis direction. The permanent magnet 251 is magnetized in the z-axis direction (a thickness direction of the moving section 22). The permanent magnet 251 is not particularly limited, and may use, for example, a neodymium magnet, a ferrite magnet, a samarium-cobalt magnet, or an alnico magnet.

Meanwhile, the coil 252 is fixed to the support section 23 via a holding member 26, so as to face the permanent magnet 251 in the z-axis direction. The coil 252 is an air core coil of a cylindrical shape, and a part of the permanent magnet 251 is inserted inside the coil 252. By doing so, an electric field generated from the coil 252 may efficiently act on the permanent magnet. It is possible to achieve a low profile of the optical path deflecting element 2. The permanent magnet 251 and the coil 252 may be disposed through a predetermined gap, and in this case, the coil 252 may be wound by wires up to the vicinity of the center thereof.

Disposition of the coil 252 is not particularly limited if an electric field can act on the permanent magnet 251. In the present embodiment, the drive mechanism 25 may be provided as a "moving magnet type" in which the permanent magnet 251 is disposed in the moving section 22. Alternatively, the permanent magnet 251 and the coil 252 may be reversely disposed. That is, the drive mechanism 25 may be a "moving coil type" in which the coil 252 is disposed in the moving section 22. However, by having the "moving magnet type" drive mechanism 25, heat from the coil 252 which is generated by conduction is hardly transferred to the moving section 22 and/or the glass plate 21, and it is possible to efficiently reduce a change of vibration characteristics due to heat (e.g., change of resonance frequency), bending of the glass plate 21, or the like.

The drive mechanism 25 swings the moving section 22 as follows. If the drive signal DS is not applied to the coil 252 from the voltage applying unit 253, the moving section 22 is substantially parallel to an xy plane. If the drive signal DS is applied to the coil 252 from the voltage applying unit 253, the moving section 22 swings (rotates) around the swing axis J with respect to the support section 23, in such a manner that a state illustrated in FIG. 6A and a state illustrated in FIG. 6B are repeated. By the swinging of the moving section 22 an optical axis of the image light LL is shifted, and the image is alternately displayed in the image display positions P1 and P2. Thus, pixels increase in appearance, and a high resolution of the image is achieved (refer to FIG. 2).

With reference to FIGS. 7A and 7B, the drive signal DS, which is applied to a coil 252 from a voltage applying unit 253, and a swing trajectory ST (i.e., a swing waveform) of the moving section 22 when the drive signal DS is applied to the coil 252 are described.

As illustrated in FIG. 7A, the drive signal DS is a trapezoidal wave. That is, the drive signal DS has a waveform that includes, in a single period, a flat portion DS1 that is positioned on a positive (+) side and has an approximately constant voltage, a flat portion DS3 that is positioned on a negative (−) side and has an approximately constant voltage. The waveform further includes a gradual decrease portion DS2 and a gradual increase portion DS4. In the gradual decrease portion DS2, a voltage value continuously and gradually decreases, and the portion DS2 connects the end of the flat portion DS1 to the beginning of the flat portion DS3. In the gradual increase portion DS4, a voltage value continuously and gradually increases, and the portion DS4 connects the beginning of the flat portion DS3 to the end of the flat portion DS1. The frequency of the drive signal DS varies depending on a frame rate (the number of images per second) of the projector 1. For example, if the frame rate is 120 fps, the frequency can be set as 60 Hz. Accordingly, successive images (image light LL of one frame) are alternately displayed in the image display positions P1 and P2, and it is possible to reliably obtain effects of the pixel shift described above.

Here, in practice, it is difficult to fully and constantly maintain a voltage in the flat portions DS1 and DS3, and fluctuation of the voltage may exist in the flat portions DS1 and DS3. Therefore, in the present specification, the flat portion DS1 may be defined to be a portion which is within 5% from the maximum value Vmax of the voltage, and the flat portion DS3 may be defined to be a portion which is within 5% from the minimum value Vmin of the voltage. That is, in the present specification, a range of 0.95 Vmax to Vmax may be defined to be the flat portion DS1, and a range of 0.95 Vmin to Vmin may be defined to be the flat portion DS3.

The drive signal DS which is a trapezoidal wave is configured by frequency components of a fundamental wave of a sine wave and odd harmonic waves. That is, the drive signal DS is represented by the below expression (1) of a trapezoidal wave. In expression (1), the frequency components may include, for example, a fundamental wave sin(x) that is 60 Hz, the third harmonic sin(3x) which is 180 Hz, the fifth harmonic sin(5x) which is 300 Hz, the seventh harmonic sin(7x) which is 420 Hz, etc. By adjusting the times of the gradual decrease portion DS2 and the gradual increase portion DS4 of a trapezoidal wave, it is possible to change coefficients a, b, c, . . . of each of the odd order harmonics of expression (1).

Expression (1)

$$f(x) = \frac{4}{\pi}\{\sin(x) + a\sin(3x) + b\sin(5x) + c\sin(7x)...\} \quad (1)$$

Here, the response of the moving section that is a vibrator with respect to each frequency component of the drive signal will be described. The vibrator responds to a sine wave with respect to the fundamental frequency and low-order harmonics, for example, harmonics equal to or lower than the seventh harmonic, but as the order of the harmonics increases, the vibrator cannot operate. A big sine wave movement occurs with respect to the frequency components of the drive signal close to a resonance frequency of the vibrator.

Thus, coefficients of each of the frequency components of the drive signal are adjusted in such a manner that the sum of response of the vibrator with respect to each of the frequency components of the drive signal to which the vibrator can respond to become a trapezoidal wave. That is, the times of the gradual decrease portion DS2 and the gradual increase portions DS4 in the drive signal of a trapezoidal wave are adjusted. When the sum of the response of the vibrator becomes a trapezoidal wave, the response of the vibrator can also be represented by the same shape as expression (1).

For example, in a case in which the vibrator can respond up to the seventh harmonic, if the sum of response with respect to each of the frequency components of the vibrator is referred to as F(x), the coefficients of each of the harmonics components are adjusted so as to satisfy expression (2) based on an expression of a trapezoidal wave of expression (1), and thus the vibrator can operate using the trapezoidal wave.

Expression (2)

$$F(x) = \frac{4}{\pi}\left\{\sin(x) + \frac{1}{4}\sin(3x) + \frac{1}{10}\sin(5x) + \frac{1}{25}\sin(7x)...\right\} \quad (2)$$

As illustrated in FIG. 8, it is preferable that the resonance frequency of the optical path deflecting element 2 differs from the frequency components of the drive signal DS. Here, the resonance frequency of the optical path deflecting element 2 means a resonance frequency of a torsional frequency (first resonance mode) of a vibration system 20 that is configured by the moving section 22 including the glass plate 21, the shaft sections 24a and 24b, and the permanent magnet 251 provided in the moving section 22, a resonance frequency of resonance (second resonance mode) of a plane operation of a vibration system. 200 in which the support section 23 is added to the vibration system 20, and a resonance frequency of resonance (third resonance mode) of an out-of-plane vertical operation of the vibration system 200. In this way, the resonance frequency of the optical path deflecting element 2 is set so as to be different from the frequency components of the drive signal, and thus unwanted vibration of the optical path deflecting element 2 is suppressed, and it is easy to control the behavior of the glass plate 21 using the trapezoidal wave. In the example illustrated in FIG. 8, the resonance frequency in the entirety of resonance modes and the frequency components of the drive signal are set to be different from each other, but it is not necessary for the entirety of resonance frequencies to be set by shifting a level of a gain at the time of resonance of each resonance mode. In a normal torsional vibrator, a level of a gain at the time of torsional resonance is increased, and thus the resonance frequency $f_0$ of at least torsional resonance may be set to be shifted together with the frequency components of the drive signal. The resonance frequency of FIG. 8 is an example, and a relationship between the frequency of each resonance mode and a resonance gain is changed depending on the design of the optical path deflecting element 2.

It is preferable that the resonance frequency $f_0$ of the torsional resonance of the optical path deflecting element 2 is positioned between a fundamental wave that generates the drive signal DS and the third harmonic, or between the third harmonic and the fifth harmonic. Accordingly, the resonance hardly overlaps the behavior of the moving section 22, and thus, it is possible to suppress an unwanted vibration of the moving section 22, and to perform a more stable driving (swinging of the moving section 22). Since an excessive increase in the size of the optical path deflecting element 2 can be prevented and the shaft sections 24a and 24b can be sufficiently softened, it is possible to reduce energy required for swinging the moving section 22, and to more efficiently swing the moving section 22. It is particularly preferable that the resonance frequency is positioned between the third harmonic and the fifth harmonic, among these two ranges, as illustrated in FIG. 8. Accordingly, the unwanted vibration of the moving section 22 is further suppressed.

If the resonance frequency $f_0$ is positioned between the fundamental wave and the third harmonic, it is preferable that the resonance frequency $f_0$ of the torsional resonance is sufficiently separated from both the fundamental wave and the third harmonic. Accordingly, the resonance hardly overlap the behavior of the moving section 22, and the above-described effects can be exhibited more remarkably. Here, "to be sufficiently separated" is not particularly limited, but, for example, it is preferable that the resonance frequency is separated by 10 Hz or more from both the fundamental wave and the third harmonic, and it is more preferable that the resonance frequency is separated by 30 Hz or more from both the fundamental wave and the third harmonic. In the same manner, this case is applied to a case in which the resonance frequency $f_0$ is positioned between the third harmonic and the fifth harmonic.

A swing trajectory (trajectory at the time of swinging) of the moving section 22 which is generated when the drive signal DS is applied to the coil 252 is illustrated in FIG. 7B. The swing trajectory of the moving section 22 indicates that an amplitude at the time of swinging of a predetermined portion (portion separated from the swing axis J) of the moving section 22 is recorded on a time axis. As illustrated in FIGS. 7A and 7B, the swing trajectory ST of the moving section 22 is a trapezoidal wave corresponding to the drive signal DS and has the same frequency as the drive signal DS. The waveform of the swing trajectory ST includes, in one period, a flat portion ST1, a flat portion ST3, a displacement portion ST2, and a displacement portion ST4. At the flat portion ST1, the posture of the moving section 22 is tilted on one side against the swing axis J and is maintained in that posture. At the flat portion ST3, the posture of the moving section is tilted on the other side against the swing axis J and is maintained in that posture. The displacement portion ST2 connects the end of the flat portion ST1 to the beginning of the flat portion ST3. During the displacement portion ST2, the moving section 22 swings around the swing axis J such that the moving section 22 goes from the posture at the flat portion ST1 to the posture at the flat portion ST3. The displacement portion ST4 connects the end of the flat portion ST3 to the beginning of the flat portion ST1. During the displacement portion ST4 the moving section 22 swings around the swing axis J such that the moving section 22 goes from the posture at the flat portion ST3 to the posture at the flat portion ST1. In the projector 1, the image light LL is displayed on the image display position P1 when the posture of the moving section 22 is in the flat portion ST1, and the image light LL is displayed on the image display position P2 when the posture of the moving section 22 is in the flat portion ST3. For this reason, the swing trajectory ST of the moving section 22 is formed by a trapezoidal wave, and thus it is possible to irradiate the image display positions P1 and P2 with the image light LL for a longer time, and to display a sharper image.

It may be difficult to maintain the posture of the moving section 22 in the flat portions ST1 and ST3, and a slight posture change may be made. For this reason, in the present application, it is possible to define that the flat portions ST1 and ST3 are respectively within 5% of the amplitude of the swing trajectory ST of the moving section 22. That is, the flat portion ST1 may be defined as a portion within 5% from a tilt angle and that is tilted the most on one side against the swing axis J. In the same manner, the flat portion ST3 may be defined as a portion within 5% from a tilt angle and that is tilted the most on the other side against the swing axis J.

In order to display a sharp image, it is preferable that a time rate of the flat portions ST1 and ST3 during one period is increased as much as possible. In other words, it is preferable that a time rate of the displacement portions ST2 and ST4 during one period is decreased. For example, if the frequency of the swing trajectory ST of the moving section 22 is 60 Hz (one period is 1/60 s), it is preferable that the duration of the displacement portions ST2 and ST4 are approximately 4 ms or lower. Accordingly, it is possible to display a sharp image.

With continuing reference to FIGS. 7A and 7B, for the optical path deflecting element 2, the duration time $T_{DS1}$ of the flat portion DS1 of the drive signal DS is shorter than the duration time $T_{ST1}$ of the flat portion ST1 of the swing trajectory ST of the moving section 22, and in the same manner, the duration time $T_{DS3}$ of the flat portion DS3 of the drive signal DS is shorter than the duration time $T_{ST3}$ of the flat portion ST3 of the swing trajectory ST of the moving section 22. By satisfying such a relationship, it is possible to further increase the time rate (time occupation rate) of the flat portions ST1 and ST3 during one period, and to obtain excellent image display characteristics. The waveform of the swing trajectory ST can more easily correspond to the waveform of the drive signal DS, and thus it is possible to easily control the posture of the moving section 22, and to reduce unwanted vibration of the moving section 22. The duration time $T_{ST1}$ of the flat portion ST1, the duration time $T_{ST1}$ of the flat portion ST1, the duration time $T_{DS3}$ of the flat portion DS3, and the duration time $T_{ST3}$ of the flat portion ST3 may be referred to as a maintenance time of a flat portion.

As above, the optical path deflecting element 2 is described. According to the optical path deflecting element 2, by simply applying the drive signal DS of a trapezoidal wave, the swing trajectory ST of the moving section 22 may be configured by a trapezoidal wave. That is, the swing trajectory ST of the moving section 22 is configured by a trapezoidal wave, and thus, for example, a feedback control or the like using a sensor which detects the swing trajectory of the moving section 22 is not required, and the configuration of the device becomes simpler. Thus, it is possible to obtain various merits, such as miniaturization or low cost of a device.

As above, the optical device and the image display device according to the present disclosure are described based on the embodiments which are illustrated, but the present disclosure is not limited to this. In the optical device and the image display device according to the present disclosure, the configurations of the respective units and sections can be replaced with arbitrary configurations having the same functions, and other arbitrary configurations can be added to those.

In the embodiments described above, a configuration in which the glass plate with light-transmitting property is used as the optical section is described, but the optical section may be a mirror with light-reflecting properties. In this case, the optical device according to the present disclosure can be used as an optical device for light-scanning, an optical switch, an optical attenuator, or the like.

In the embodiment described above, a liquid crystal projector is described as an image display device, but the image display device may be a projector of a light-scanning type using an optical device for light-scanning. The image display device is not limited to a projector, and in addition to this, can also be applied to a printer, a scanner, a head mount display (HMD), a head-up display (HUD), or the like.

The entire disclosure of Japanese Patent Application No. 2014-202061 filed Sep. 30, 2014 is expressly incorporated by reference herein.

What is claimed is:

1. An optical device comprising:
an optical section that includes a light-incident surface on which light is incident;
a moving section that supports the optical section;
a shaft section that swingably supports the moving section such that a predetermined portion of the moving section is swung, wherein a swing waveform representative of a trajectory of the moving section as the moving section is swung has a trapezoidal waveform; and
an actuator that swings the moving section based on a drive signal, wherein the drive signal is applied to the actuator to swing the moving section and has a trapezoidal waveform, and a maintenance time of a flat portion of the trapezoidal waveform of the drive signal is shorter than a maintenance time of a flat portion of the trapezoidal waveform of the swing waveform of the moving section.

2. The optical device according to claim 1,
wherein the drive signal includes multiple frequency components that are configured by a fundamental frequency and odd order harmonics of a sine wave.

3. The optical device according to claim 2,
wherein the maintenance time of the flat portion of the drive signal is changed by changing a ratio between the fundamental frequency and the odd order harmonics.

4. The optical device according to claim 3,
wherein the frequency components contained in the drive signal differ from resonance frequencies of a vibration system that swings the moving section.

5. The optical device according to claim 4,
wherein a torsional resonance frequency that swings the moving section, among the resonance frequencies of the vibration system, is positioned between the fundamental frequency of the frequency components of the drive signal and a fifth harmonic of the odd order harmonics.

6. The optical device according to claim 3,
wherein the actuator is an electromagnetic drive actuator.

7. The optical device according to claim 2,
wherein the frequency components contained in the drive signal differ from resonance frequencies of a vibration system that swings the moving section.

8. The optical device according to claim 7,
wherein a torsional resonance frequency that swings the moving section, among the resonance frequencies of the vibration system, is positioned between the fundamental frequency of the frequency components of the drive signal and a fifth harmonic of the odd order harmonics.

9. The optical device according to claim 2,
wherein the actuator is an electromagnetic drive actuator.

10. An image display device comprising:
the optical device according to claim 2.

11. The image display device according to claim 10,
wherein the optical device shifts a position of an image that is displayed by application of light by spatially modulating the light.

12. The optical device according to claim 1,
wherein the drive signal includes multiple frequency components that differ from resonance frequencies of a vibration system that swings the moving section.

13. The optical device according to claim 12,
wherein a torsional resonance frequency that swings the moving section, among the resonance frequencies of the vibration system, is positioned between a fundamental frequency of the frequency components of the drive signal and a fifth harmonic of odd order harmonics of a sine wave.

14. The optical device according to claim 12,
wherein the actuator is an electromagnetic drive actuator.

15. The optical device according to claim 1,
wherein the actuator is an electromagnetic drive actuator.

16. The optical device according to claim 15,
wherein the actuator includes a permanent magnet and a coil that generates an electric field that acts on the permanent magnet, and
wherein one of the permanent magnet and the coil is provided in the moving section, and the other is provided so as to face the other one.

17. The optical device according to claim 1,
wherein the moving section has light-transmitting property.

18. The optical device according to claim 1,
wherein the moving section and the shaft section include resin materials.

19. An image display device comprising:
the optical device according to claim 1.

20. The image display device according to claim 19,
wherein the optical device shifts a position of an image that is displayed by application of light by spatially modulating the light.

* * * * *